United States Patent
Puckett et al.

(10) Patent No.: US 12,306,513 B2
(45) Date of Patent: May 20, 2025

(54) NONLINEAR WAVE MIXING SYSTEM WITH GRATING-ASSISTED PHASE MATCHING

(71) Applicant: Honeywell International Inc., Charlotte, NC (US)

(72) Inventors: Matthew Wade Puckett, Phoenix, AZ (US); Chad Fertig, Roseville, MN (US); Matthew Robbins, Minneapolis, MN (US); Jad Salman, Wayzata, MN (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 18/584,710

(22) Filed: Feb. 22, 2024

(65) Prior Publication Data

US 2024/0192574 A1 Jun. 13, 2024

Related U.S. Application Data

(62) Division of application No. 17/900,688, filed on Aug. 31, 2022, now Pat. No. 11,940,715.

(51) Int. Cl.
*G02F 1/35* (2006.01)
*G02F 1/365* (2006.01)
(Continued)

(52) U.S. Cl.
CPC ............ *G02F 1/3548* (2021.01); *G02F 1/353* (2013.01); *G02F 1/3534* (2013.01);
(Continued)

(58) Field of Classification Search
CPC .... G02F 1/3548; G02F 1/3775; H01S 3/0092; H01S 3/109
See application file for complete search history.

(56) References Cited

U.S. PATENT DOCUMENTS 5,434,700 A 7/1995 Yoo
5,488,681 A 1/1996 Deacon et al.
(Continued)

OTHER PUBLICATIONS

Blau et al., "Letter to the Editor; Second-harmonic generation using subwavelength gratings in planar waveguides", Pure and Applied Optics, Jul. 1, 1997, vol. 1, No. 4, pp. L23 through L28.
(Continued)

*Primary Examiner* — Daniel Petkovsek
(74) *Attorney, Agent, or Firm* — Fogg & Powers LLC

(57) ABSTRACT

A nonlinear wave mixing system with grating assisted phase matching is provided. The system includes a pump laser and a nonlinear waveguide. The pump laser is used to generate pump light at a select wavelength. The nonlinear waveguide is configured to generate produced light from the pump light that is directed into the nonlinear waveguide. The nonlinear waveguide includes at least one backward grating that is configured to diffract the produced light in a backward direction relative to a direction the produced light travels in the nonlinear waveguide to reach the backward grating. The backward grating having a grating momentum that generates counter-propagating phase matching in the produced light.

4 Claims, 9 Drawing Sheets

(51) Int. Cl.
*G02F 1/377* (2006.01)
*H01S 3/00* (2006.01)
*H01S 3/109* (2006.01)

(52) U.S. Cl.
CPC ............ *G02F 1/3544* (2013.01); *G02F 1/365* (2013.01); *G02F 1/3775* (2013.01); *H01S 3/0092* (2013.01); *H01S 3/109* (2013.01); *G02F 2201/305* (2013.01)

(56) References Cited

U.S. PATENT DOCUMENTS

| | | | |
|---|---|---|---|
| 5,854,870 | A | 12/1998 | Helmfrid et al. |
| 5,915,053 | A * | 6/1999 | Jeong ................. G02B 6/12007 385/37 |
| 6,943,925 | B1 | 9/2005 | Islam |
| 7,664,147 | B2 | 2/2010 | Cohen et al. |
| 8,149,501 | B2 | 4/2012 | Arahira |
| 8,411,353 | B2 | 4/2013 | Kashyap et al. |
| 11,940,715 | B2 * | 3/2024 | Puckett ................... G02F 1/353 |
| 2008/0137696 | A1 | 6/2008 | Zhang et al. |
| 2012/0134012 | A1 | 5/2012 | Guerin et al. |
| 2016/0064891 | A1 | 3/2016 | Imeshev et al. |
| 2021/0116783 | A1 | 4/2021 | Puckett et al. |

OTHER PUBLICATIONS

Cohen et al., "Grating Assisted Phase Matching in Extreme Nonlinear Optics", Physical Review Letters 99, Jul. 31, 2007, pp. 53902-1 through 53902-4.
European Patent Office, "Extended European Search Report", from EP Application No. 231783200.2 from Foreign Counterpart to U.S. Appl. No. 17/900,688, filed Jan. 19, 2024, pp. 1 through 10, Published: EP.
Gagnon et al., "Relaxed phase-matching constraints in zero-index waveguides", Physics Optics, Feb. 25, 2021, pp. 1 through 6 and "Supplementary Information: Relaxed phase-matching constraints in zero-index waveguides", pp. 1 through 11.
Hayat et al., "Phasematching in semiconductor nonlinear optics by linear long-period gratings", Applied Physics Letters, May 9, 2008, vol. 92, Issue 18, pp. 181110-1 through through 181110-3.
Janjan et al., "Quasi-Phase Matched Second Harmonic Generation in Plasmonic-Organic Hybrid Structures", Journal of Lightwave Technology, vol. 38, No. 6, Mar. 15, 2020, pp. 1391 through 1399.
Mu et al., "Backward second-harmonic generation in submicron-period ion-exchanged KTiOPO4 waveguide", Optics Communications, Jul. 1, 2000, vol. 181, pp. 153 through 159.
Sidorenko et al., "Sawtooth grating-assisted phase-matching", Optics Express Oct. 11, 2010, vol. 18, No. 22, pp. 22686 through 22692, Published: US.
Sun et al., "Space Harmonic Distribution at Bragg Condition in Periodical Dielectric Waveguides", 2013 13th International Conference on Numerical Simulation of Optoelectronic Devices (NUSOD), IEEE, Sep. 7, 2015, pp. 93 through 94.
U.S. Patent and Trademark Office, "Notice of Allowance", U.S. Appl. No. 17/900,688, dated Nov. 22, 2023, pp. 1 through 9, Published: US.
U.S. Patent and Trademark Office, "Office Action", U.S. Appl. No. 17/900,688, dated Aug. 8, 2023, pp. 1 through 16, Published: US.
U.S. Patent and Trademark Office, "Restriction Requirement", U.S. Appl. No. 17/900,688, dated Apr. 26, 2023, pp. 1 through 8, Published: US.
Wang et al, "Second harmonic generation in nano-structured thin-film lithium niobate waveguides", Optics Express, vol. 25, Issue 6, pp. 6963 through 6973, Mar. 16, 2017, Published: US.

* cited by examiner

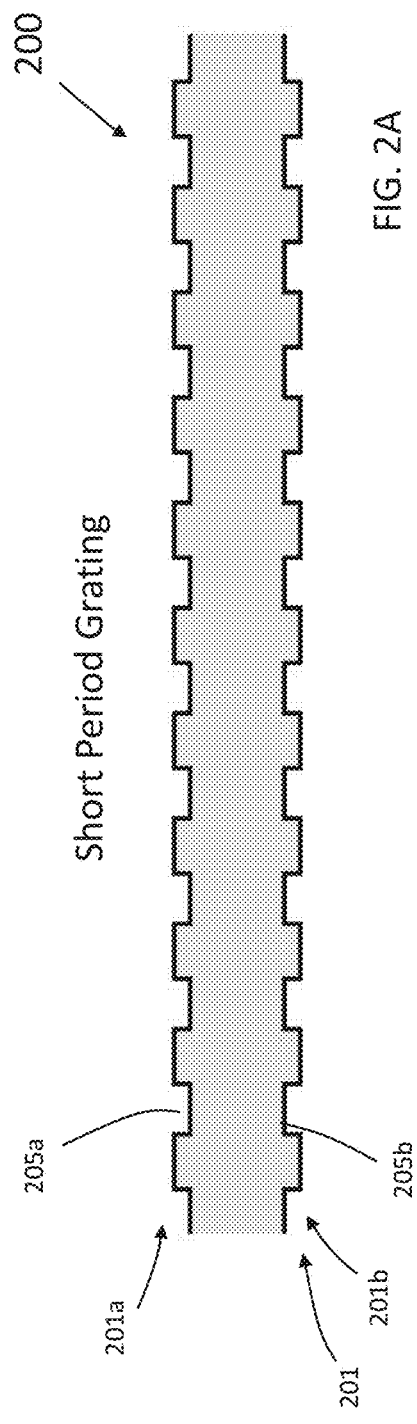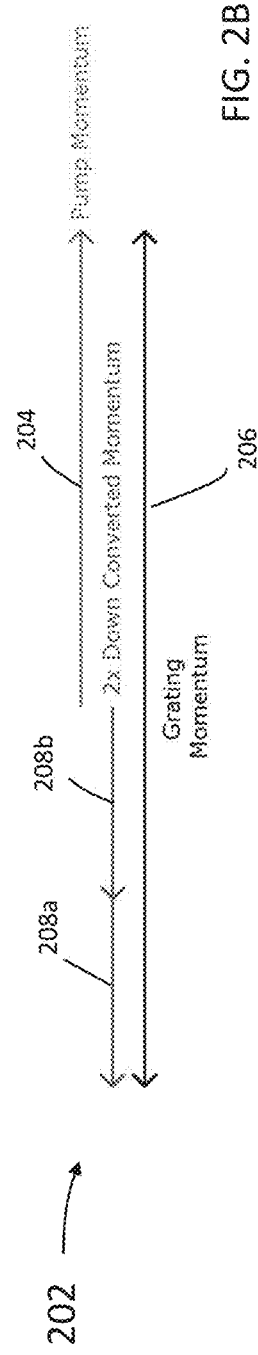

NONLINEAR WAVE MIXING SYSTEM WITH GRATING-ASSISTED PHASE MATCHING

STATEMENT REGARDING FEDERALLY SPONSORED RESEARCH OR DEVELOPMENT

This invention was made with Government support under NRO000-20-C0025 awarded by National Reconnaissance Office (NRO). The Government has certain rights in the invention.

CROSS-REFERENCE TO RELATED APPLICATIONS

This Application claims priority to U.S. Pat. No. 11,940,715, same title herewith, filed on Aug. 31, 2022, which is incorporated in its entirety herein by reference.

BACKGROUND

In many applications involving optics and photonics, it is often desirable to produce light at either twice a pump wavelength or one half of a pump wavelength. This may be done with wave mixing. Wave mixing employs either a second-harmonic generation to produce twice the pump wavelength or a degenerate down conversion to produce one half the pump wavelength.

Second-harmonic generation, also called frequency doubling, is a nonlinear optical process, in which photons interacting with a nonlinear material are effectively 'combined' to form new photons having twice the frequency of initial photons and having half the free space wavelength. In a degenerative down conversion, it is the inverse of the second-harmonic generation, where one photon directed into the same nonlinear material splits into two photons with half the frequency or twice the wavelength. For a general down conversion, the energy of daughter photons must sum the energy of a parent photon.

Both second-harmonic generation and down conversion require the use of material possessing a nonzero second-order nonlinear coefficient. An example of such a material is Lithium Niobate. In general, the conversion efficiency for the wave mixing process increases with the length across which a beam of pump light propagates through a nonlinear medium. Efficiency also increases as the cross-sectional area of the pump light is reduced. As a result, high confinement waveguides composed of thin films are capable of producing wave mixing devices with the highest efficiencies.

One challenge with known wave mixing techniques involves phase matching. Phase matching is a matching of optical momentum between the pump light and light produced through the wave mixing effect. In the absence of phase matching, in a down conversion example, the momentum of a single pump photon does not match the momentum of the two down conversion photons it produces. As a result, there is not a coherent build-up of power at the down conversion wavelength because the down converted light interferes destructively with the pump light as the two fields propagate through the nonlinear medium. The same occurs in second-harmonic generation wave mixing.

Three techniques have been used to obtain phase matching in wave mixing. The first technique is known as quasi-phase matching. In this technique, the nonlinear material is periodically inverted to compensate for the difference in momentum. This is done by applying high voltages across the nonlinear medium. The shortcoming of this approach is that it requires additional fabrication steps and is sensitive to the exact method used to periodically pole the nonlinear medium.

The second technique for phase matching is known as modal phase matching. In this technique, a higher-order spatial mode at the pump wavelength is phase matched to the fundamental mode at the down conversion wavelength in a down conversion example. This is easier to realize than quasi-phase matching, but it typically produces lower efficiencies, due to a reduced overlap between two dissimilar optical modes and a higher loss coefficient of the higher-order mode.

The third technique for phase matching is called grating-assisted phase matching. In this technique, the sidewalls of the nonlinear waveguide are periodically modulated to add momentum to the down conversion light to compensate for the initial momentum mismatch. This technique preserves the higher mode overlap and lower loss of quasi-phase matching allowing for the simplified fabrication of model phase matching. However, a weakness of grating-assisted phase matching is that, due to the long period of the grating relative to the optical wavelength typically used, the grating induces a large additional effect known as Bloch loss, that can drastically reduce conversion efficiency. A Bloch loss is associated with any diffraction that results in light leaving the modes of interest, such as diffraction into higher order modes or free-space modes.

For the reasons stated above and for other reasons stated below which will become apparent to those skilled in the art upon reading and understanding the present specification, there is a need in the art for an efficient and effective system to obtain phase matching in a wave mixing device.

SUMMARY

The following summary is made by way of example and not by way of limitation. It is merely provided to aid the reader in understanding some of the aspects of the subject matter described. Embodiments provide lossless grating assisted phase matching in a nonlinear wave mixing device.

In one embodiment, a nonlinear wave mixing system with grating-assisted phase matching is provided. The system includes a pump laser and a nonlinear waveguide. The pump laser is used to generate pump light at a select wavelength. The nonlinear waveguide is configured to generate produced light from the pump light that is directed into the nonlinear waveguide. The nonlinear waveguide includes at least one backward grating that is configured to diffract the produced light in a backward direction relative to a direction the produced light travels in the nonlinear waveguide to reach the backward grating. The backward grating having a grating momentum that generates counter-propagating phase matching in the produced light.

In another embodiment, a nonlinear waveguide for a nonlinear wave mixing system is provided, the nonlinear waveguide including nonlinear material and a backward grating. The nonlinear material is configured to generate produced light from pump light. The backward grating is formed in the nonlinear material. The backward grating is configured to diffract the produced light in a backward direction relative to a direction the produced light travels in the nonlinear material to reach the backward grating. The backward grating has a grating momentum that generates counter-propagating phase matching in the produced light.

In yet another embodiment, a method of forming a nonlinear wave mixing system with grating assisted phase matching is provided. The method includes determining a momentum of a backward grating needed to generate counter-propagating phase matching in produced light; and forming the backward grating using the determined momentum of the backward grating in a nonlinear waveguide. The backward grating configured to diffract the produced light in a backward direction relative to a direction the produced light traveled in the nonlinear waveguide to reach the backward grating.

BRIEF DESCRIPTION OF THE DRAWINGS

The present invention can be more easily understood and further advantages and uses thereof will be more readily apparent, when considered in view of the detailed description and the following figures in which:

FIG. 2A illustrates a nonlinear waveguide having a short period grating according to one exemplary embodiment;

FIG. 2B is a graph that illustrates that no lossy Bloch modes are associated with the nonlinear waveguide of FIG. 2A;

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments provide using a nonlinear wave mixing system with grating assisted phase matching. In embodiments, pump light is diffracted by a grating to generate produced light (second-harmonic light or down converted light) that travels in a backward direction relative to the pump light entering the nonlinear waveguide. The grating or gratings in an example used have a short period that does not produce Bloch loss, resulting in significantly higher efficiencies than can be achieved with current phase matching systems.

Only specific diffraction momenta provided by a grating produce the phase matching condition that results in second-harmonic or down conversion generation. If a waveguide does not have a grating to generate the specific diffraction momenta, the pump light will not produce a significant amount of second-harmonic power, or the inverse case, will not produce a significant amount of down conversion power.

Figure 1A:
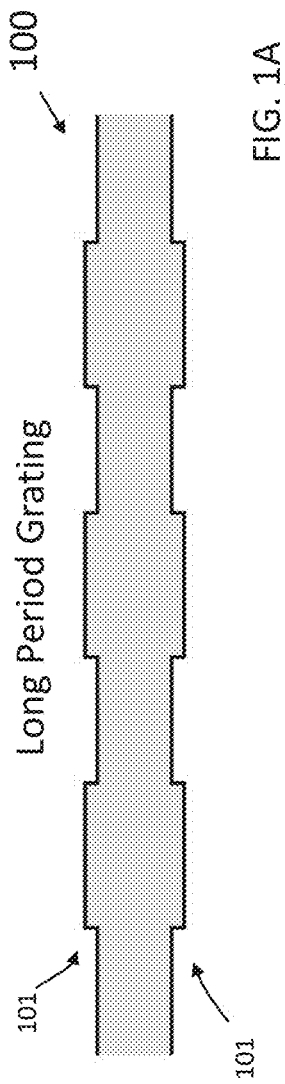
FIG. 1A illustrates a waveguide having a long period grating of the prior art.
Figure 1B:
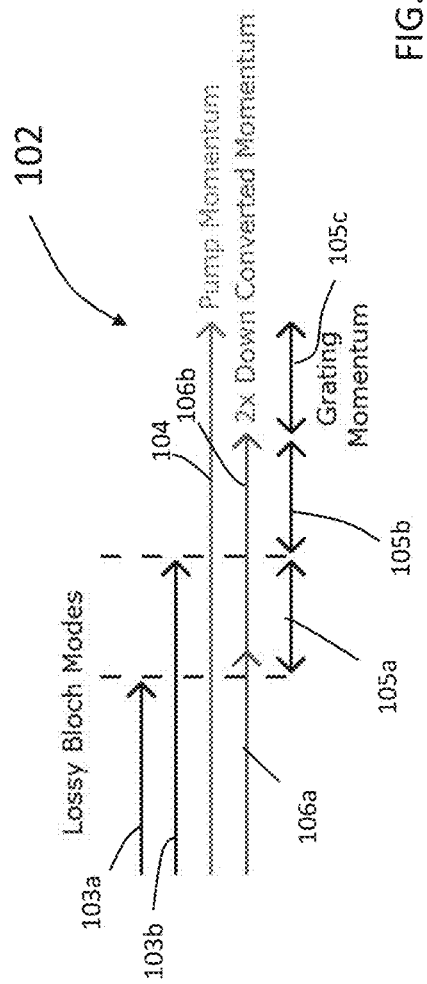
FIG. 1B illustrates a graph that shows lossy Bloch modes associated the prior art waveguide of FIG. 1A.

An example of a prior art waveguide 100 having a forward grating is illustrated in prior art FIG. 1A for further background. Waveguide 100 includes a long-period grating 101. The grating 101 of FIG. 1A, is used to phase match with a forward-to-forward second-harmonic generation or forward-to-forward down conversion. This arrangement and approach results in high Bloch mode losses. An illustration of lossy Bloch modes, as the result of the long-period grating (low momentum) in the forward-to-forward, prior art example of FIG. 1A is illustrated by lossy Bloch modes arrows 103a and 103b in graph 102 of FIG. 1B in a down conversion example. In forward grating assisted phase matching, most of the Bloch loss is into free-space modes. The long-period grating 101 provides a grating momentum illustrated by the low grating momentum double arrow lines 105a, 105b and 105c. The length pump momentum arrow 104 in FIG. 1B corresponds to a pump momentum that the pump photon carries. With phase matching in down conversion, two times the pump momentum arrow 104 is desired with the down conversion momentum illustrated with the down conversion (down converted) momentum arrows 106a and 106b. Ideally the sum of arrows 106a and 106b would match the length of pump momentum arrow 104 when phase matching occurs. Further, the forward-to-forward configuration allows the pump light to also diffract out of the waveguide 100 into free space mode resulting in a loss of the pump light which is not ideal.

As discussed above, the embodiments eliminate the lossy Bloch modes using a grating with high momentum and a phase match forward-to-backward for second-harmonic light or down conversion light. An illustration of a nonlinear waveguide 200 with a lossless backward grating 201 in FIG. 2A. In this example the backward grating 201 includes first and second sidewall gratings 201a and 201b that are formed in sidewalls 205a and 205b of the nonlinear material of the nonlinear waveguide 200. The use of short period sidewall gratings 201a and 201b results in a high momentum grating. Further, forward-to-backward second-harmonic generation or forward-to-backward down conversion generation from the short-period sidewall grating in the nonlinear waveguide 200 eliminates the lossy Block modes that occur in the prior art. Referring to FIG. 2B, a graph 202 that illustrates the result of the forward-to-back and short-period sidewall backward grating 201 in a down conversion example. The pump momentum is illustrated by pump momentum arrow 204. The large grating momentum (as a result of the short-period grating) is illustrated with a grating momentum double arrow line 206. Further illustrated in FIG. 2B is the generated down conversion momentum 208a and 208b. No lossy Bloch modes are generated in this example.

Figure 3A:
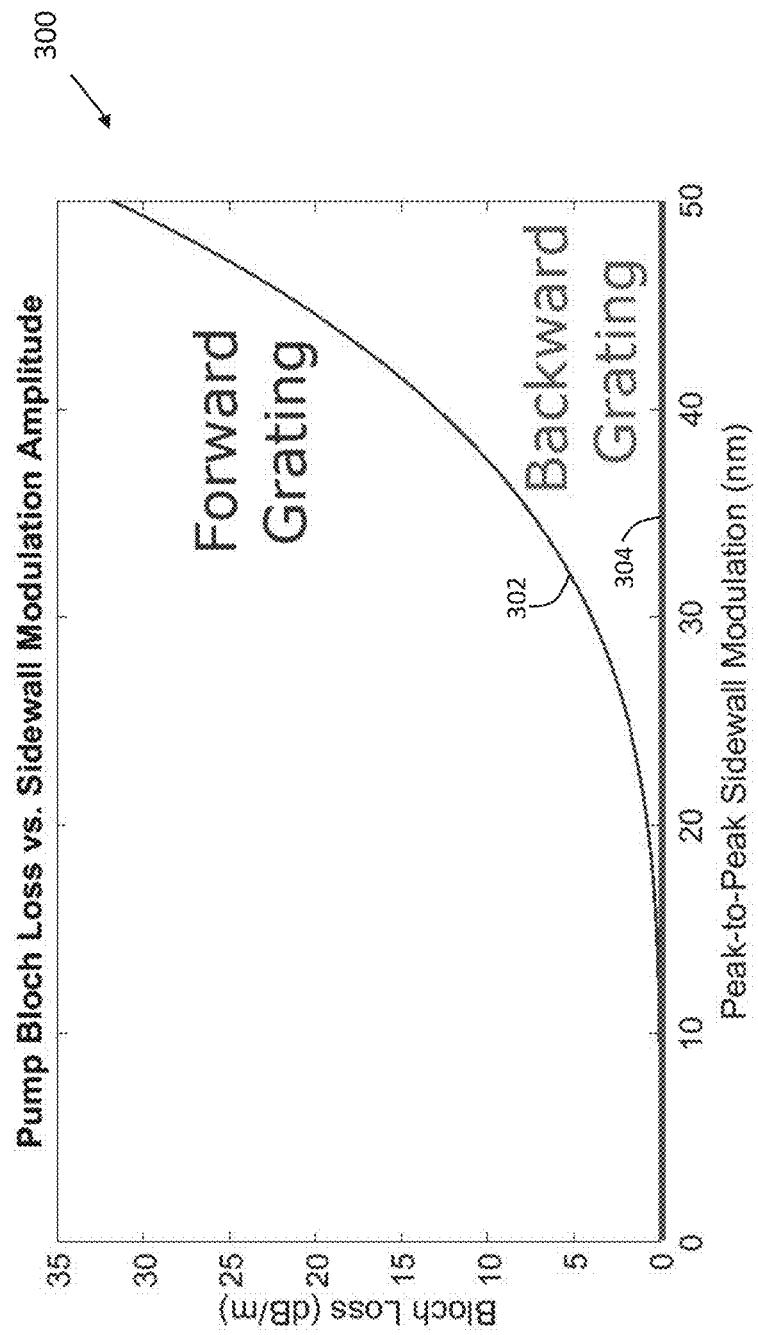
FIG. 3A is a graph that illustrates pump Bloch loss verse sidewall amplitude.
Figure 3B:
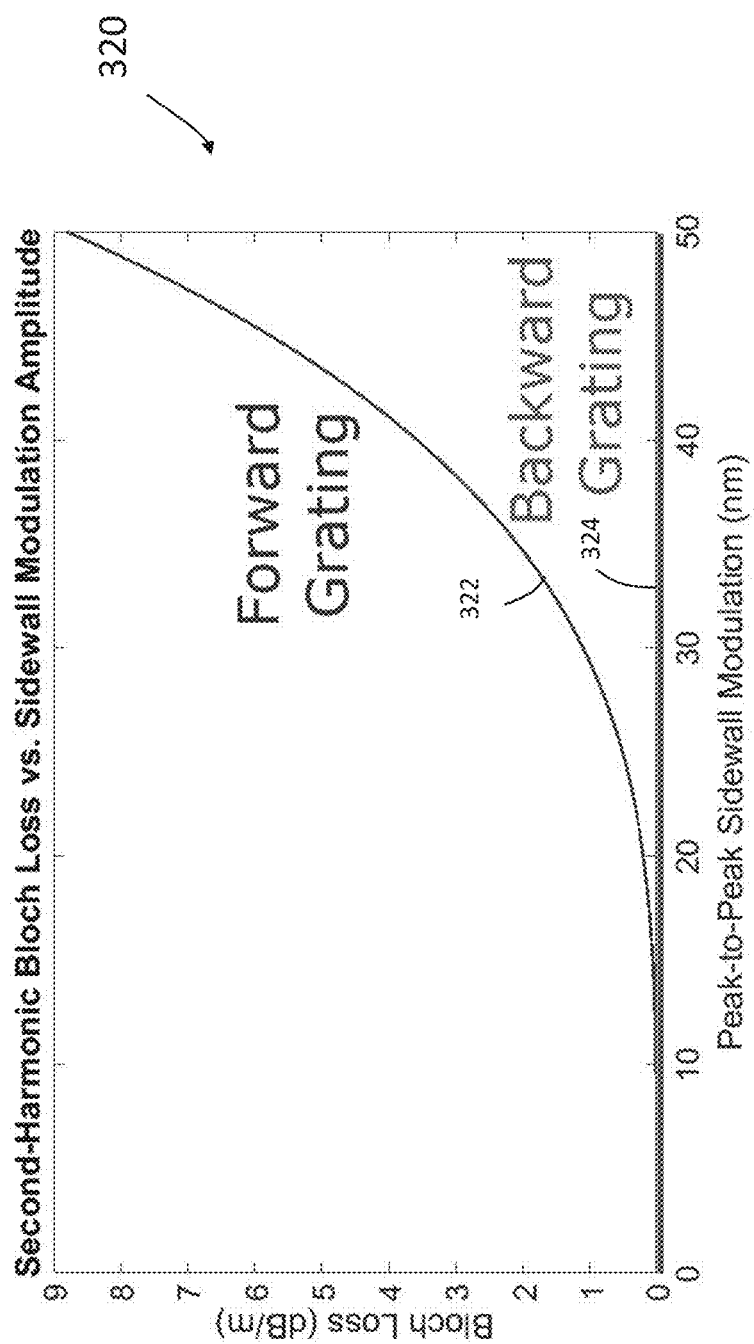
FIG. 3B is a graph that illustrates second-harmonic Bloch loss verse sidewall modulation.

Graphs 300 and 320 of FIGS. 3A and 3B further illustrate example pump Bloch loss verses sidewall modulation for forward and backward phase matching using sidewall modulation as illustrated in FIGS. 1A and 2A. The Bloch loss is plotted as a function of sidewall modulation amplitude for the pump modes in FIG. 3A and the Bloch loss is plotted as a function of sidewall modulation amplitude for the pump modes in second-harmonic modes in FIG. 3B. As illustrated, higher modulation amplitude increases the coupling between the pump light and second-harmonic light. However, in the forward phase matching example, large amounts of Bloch loss have occurred. In particular, referring to graph 300 of FIG. 3A, the forward pump Bloch loss 302 associated with a forward grating, increases with an increase in modulation while with a backward grating, the pump Bloch loss 304 remains a zero for an increase in modulation. Similarly, as illustrated in graph 320 of FIG. 3B, the forward second-harmonic Bloch loss 322 associated with a forward grating, increases with an increase in modulation while with a backward grating the second-harmonic Bloch loss 324 remains a zero for an increase in modulation.

Figure 3C:
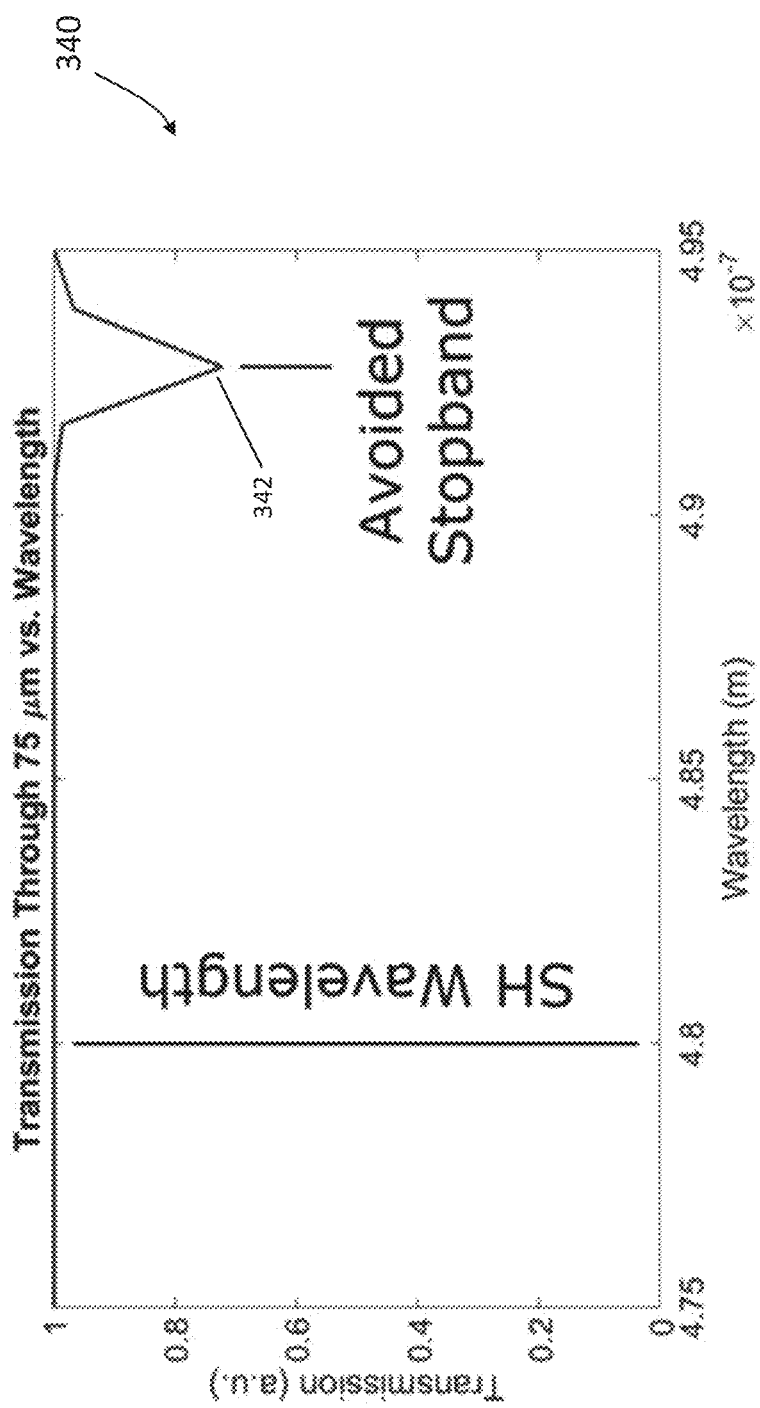
FIG. 3C is a graph that illustrates a transmission through 75 μm verses wavelength.

One additional nuance of the technique described, is that for the Bloch loss to be zero with backward phase matching, the effective index of the pump mode cannot be matched to the effective index of any of the higher-order modes at the second-harmonic frequency. If it is, a Bragg stopband 342 is created at the second-harmonic frequency which will diffract into a higher-order mode, creating loss. This is illustrated in the transmission verses wavelength graph 340 of FIG. 3C.

Figure 4:
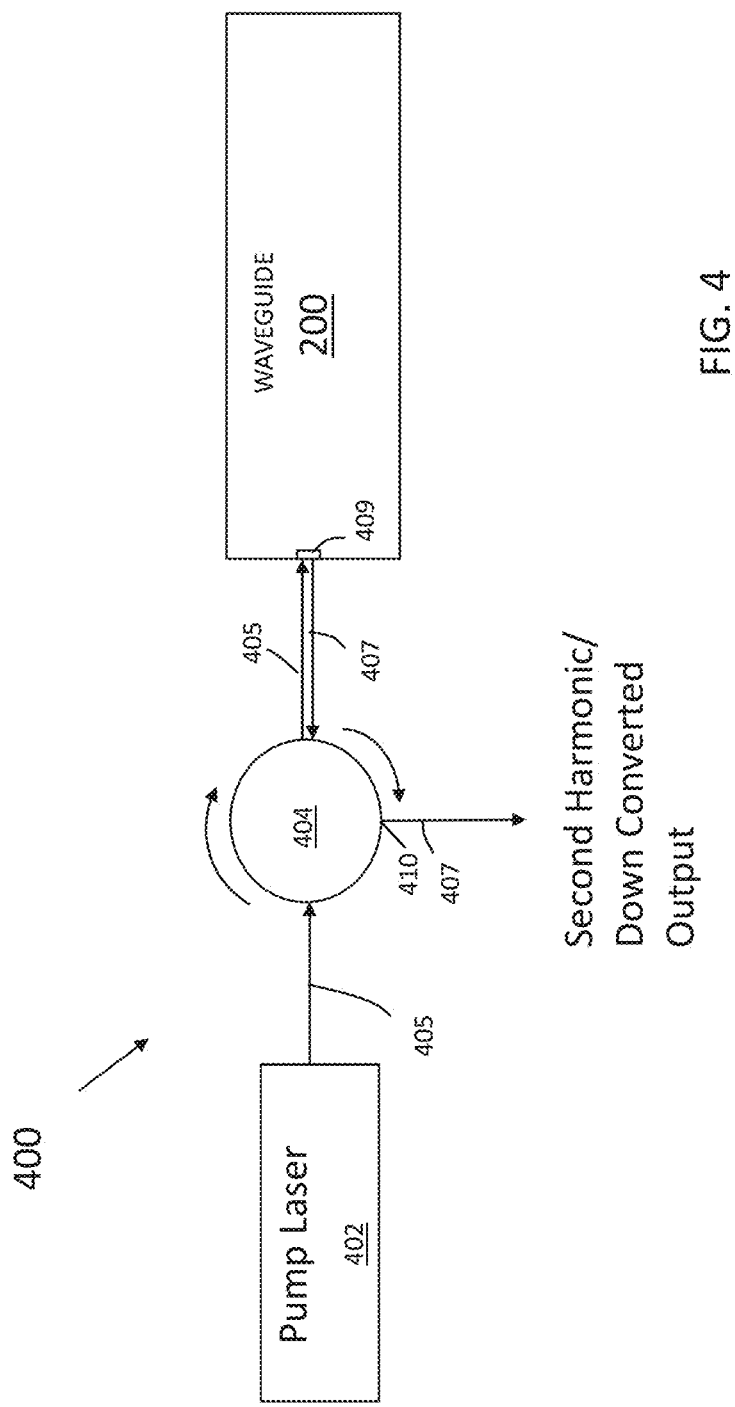
FIG. 4 illustrates a block diagram of a nonlinear wave mixing system with grating assisted phase matching according to one exemplary embodiment.

FIG. 4 illustrates a block diagram of a nonlinear wave mixing system 400 with grating assisted phase matching of an example embodiment. The nonlinear wave mixing system 400 with grating assisted phase matching includes a pump laser 402 that generates pump light 405 at select wavelength. A light signal directing device 404 such as, but not limited to, a circulator directs the pump light 405 to a port 409 of a nonlinear waveguide 200 that includes a backward grating such as backward grating 201 described above. The nonlinear waveguide 200, is made from a nonlinear material such as, but not limited to, Lithium Niobate that generates produced light form the pump light 405. The produced light 407 is diffracted back out of the nonlinear waveguide 200 by the backward grating 201 in the direction the pump light 405 entered the nonlinear waveguide 200 (forward-to-backward) through the port 409 in this example. Hence, in this example port 409 is both an input port for the pump light to enter the nonlinear waveguide 200 and an output port for produced light 407 to exit the nonlinear waveguide 200. The produced light 407 may be down conversion light or second-harmonic light depending on the configuration. The light signal directing device 404 is configured to output the produced light 407 having a select wavelength at an output 410.

As discussed above, the light signal directing device 404 may be a circulator. In another example, the light signal directing device 404 may include one or more beam splitters designed to direct the pump light 405 to the nonlinear waveguide 200 and direct the produced light 407 or to the output 410.

In a down conversion example, a pump light 405 may have a wavelength of 775 nm. The corresponding produced light 407 or down conversion light, in this example, will have a wavelength of 1550 nm. The down conversion light at a wavelength of 1550 nm, diffracted by grating 201, travels in backwards direction relative to the direction of travel the pump light 405 entered the nonlinear waveguide 200. A short grating period is used that does not produce Bloch loss. This results in significantly higher efficiencies over known phase matching systems. In a second-harmonic generation, a pump light of, for example 1550 nm, would results in a produced light 407 or up conversion light having a wavelength of the 775 nm.

As discussed above, instead of using co-propagating phase matching, embodiments use counter-propagating phase matching provided by the backward grating 201 that gives a large momentum transfer. Since the momentum of the grating is large, the period of the grating is short. As a result, diffraction orders into lossy free space modes are not produced. Further, the use of this approach still allows the matching of fundamental mode pump photons to fundamental mode generated photons. Hence the use of higher mode matching techniques and periodic polling of waveguide material is not needed for this technique. Phase matching between the fundamental modes, in embodiments, is achieved by forming at least one grating into the waveguides.

The short period sidewall gratings 201a and 201b of backward grating 201 are selected to provide a grating momentum that matches a difference between the two states of momentum (the sum of the two photons momentum) in a down conversion example. In an example, photolithographic techniques may be used to form the sidewall gratings 201a and 201b in the nonlinear waveguide 200.

In forming the sidewall gratings 201a and 201b in the nonlinear waveguide 200 in a down conversion example, the momentum of the pump light and the down conversion light is first determined. The momentum of the backward grating 201 is then determined based on the determined momentum of the pump light and the momentum of the produced light which is the down conversion light in this example using the following equation:

$$k\_grating = (k\_pump + \text{sum of momentum of the down converted photons})$$

Where k_pump is the pump photon momentum and the sum of the momentum of the down converted photons is the sum of two photon daughter momenta.

e grating may then be written into a lithography mask for the nonlinear waveguide 200. The nonlinear waveguide 200 may then be fabricated through well-established processes for thin film waveguides. To operate the device, pump light is directed into one end of the nonlinear waveguide 200, and down conversion light is output from the same end as the pump light entered the nonlinear waveguide 200 in an example as discussed above.

In the case of second-harmonic application, the pump light 405 is similarly directed into one end of the nonlinear waveguide 200 and the second-harmonic light is output from the same end of the nonlinear waveguide 200 as illustrated in FIG. 4. The momentum of the backward grating 201 in a second-harmonic application may be determined by the following equation:

$$k\_grating = (2*k\_pump + k\_sh)$$

Where k_sh is the second-harmonic momentum. The momentum of the pump light 405, the second-harmonic light, and the down conversion light may be determined using a finite difference time domain simulation tool. An example of a simulation tool that may be used includes the Lumerical™ finite difference time domain simulation tool from Ansys Inc.

Although, FIG. 2B illustrates the backward grating 201 being formed of two sidewall gratings 201a and 201b, in other examples only one grating may be used which may or may not be formed in a sidewall of the nonlinear waveguide. Other example configurations of gratings that may be used include a hole configuration in the middle of the nonlinear waveguide, periodically spaced pillars that may be positioned beside the nonlinear waveguide, or other regular repeating structures which modify the propagation of light down a waveguide.

Figure 5:
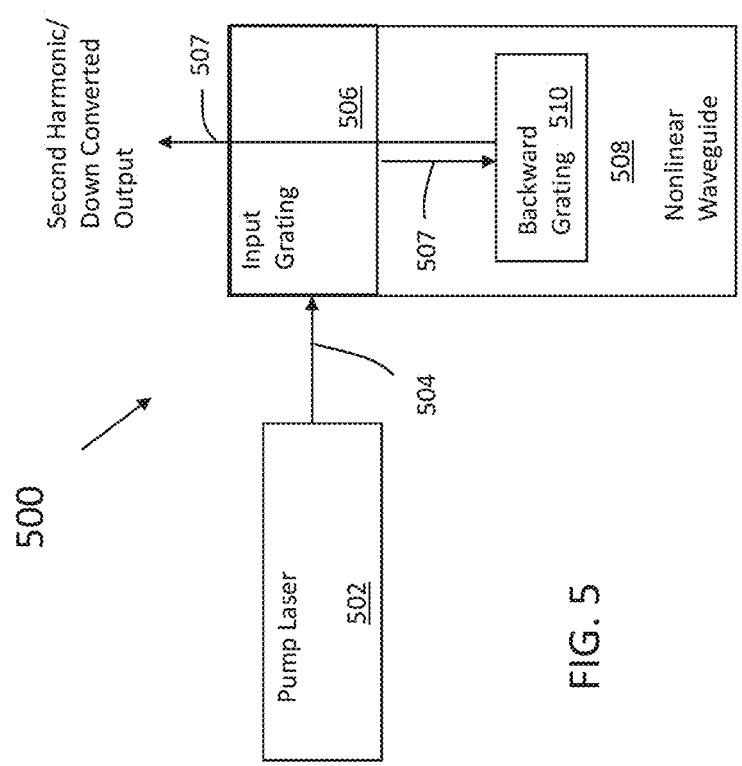
FIG. 5 illustrates a block diagram of a nonlinear wave mixing system with grating assisted phase matching according to another exemplary embodiment.

Further, although a grating or gratings used, as described above, diffract the produced light (second-harmonic light or down conversion light) back in the direction that the pump light entered the nonlinear waveguide, it is possible in other examples, to output the produced light from a nonlinear waveguide through a different output if desired. An example is illustrated in the block diagram of the nonlinear wave mixing system 500 with grating assisted phase matching of FIG. 5. In this example, pump laser 502 generates a pump light 504 that is directed to an input grating 506 that may be formed in a nonlinear waveguide 508. The input grating 506 is designed to direct the pump light 504 through nonlinear material of nonlinear waveguide 508 to generate produced light 507 that is received by a backward grating 510. The backward grating 510 diffracts the produced light 507 backward relative to a direction the produced light 507 travels in the nonlinear material of the nonlinear waveguide 508 to reach the backward grating 510. The backward grating 510 has a grating momentum that generates counter-propagating phase matching in the produced light. Further, the input grating 506 is not designed to diffract a wavelength of the produced light. Hence, the produced light 507 traveling away from the backward grating 510 passes though the input grating 506 and is output from the nonlinear waveguide 508 in a different location relative to the location in which the pump light 504 is received into the nonlinear waveguide 508. Moreover, the input grating 506 is designed to output the produced light 507 in different direction than the direction the pump light 504 entered the input grating 506. Other systems may also be used to direct the produced light 507 to a different output of a nonlinear waveguide.

As discussed above, the backward grating 510 is designed to have a grating momentum that generates counter-propagating phase matching in the produced light 507 traveling in opposite directions. Examples of designs of the backward grating 506 include one or more sidewall gratings as shown above, a hole configuration in the middle of the nonlinear waveguide, spaced pillars that may be positioned outside the nonlinear waveguide, etc. as discussed above.

Figure 6:
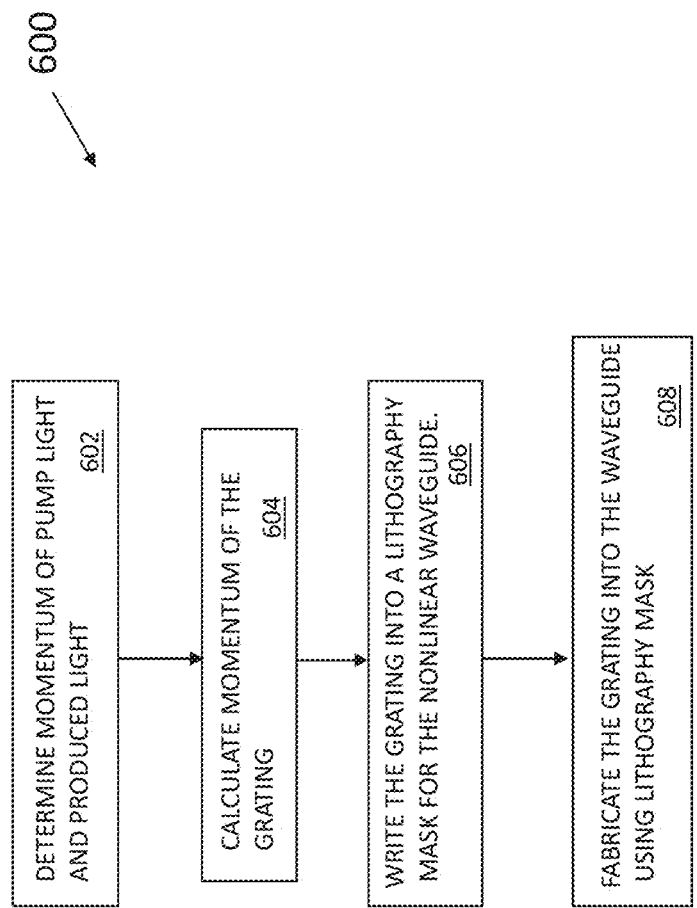
FIG. 6 illustrates a flow diagram of a method to form a backward grating in a nonlinear waveguide according to another exemplary embodiment.

FIG. 6 illustrates flow diagram 600. Flow diagram 600 provides a method to form a backward grating in a nonlinear waveguide. The flow diagram 600 is provided as a series of sequential blocks. The sequence of the blocks in other embodiments may be in a different order or may occur in parallel. Hence, embodiments are not limited to the sequence of blocks as set out in FIG. 6.

Flow diagram 600 starts at block 602, where the momentum of the pump light and produced light is determined. As discussed above, the produced light is either the second-harmonic light or the down conversion light. One method to determine the momentum of the desired produced light is with the use of a finite difference time domain simulation tool as discussed above.

Based on the determined momentum of the pump light and the produced light, the momentum of an associated grating is determined at block 604 based on the appropriate equation (i.e., second-harmonic light or down conversion light equation) as set out above. Once the momentum of the grating is determined at block 604, the grating is written into a lithography mask for a nonlinear waveguide at block 606 using the momentum of the grating. The grating is then formed in the nonlinear waveguide using known semiconductor fabrication techniques at block 608.

Figure 7:
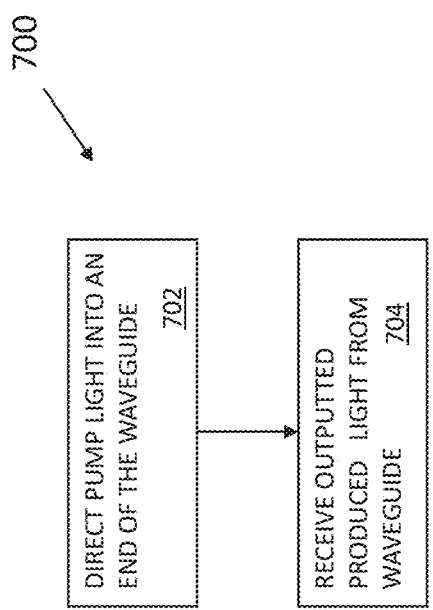
FIG. 7 illustrates a flow diagram of a method using a nonlinear wave mixing system with grating assisted phase matching according to one exemplary embodiment.

FIG. 7 illustrates flow diagram 700. Flow diagram 700 provides a method of using a nonlinear wave mixing system with grating assisted phase matching. The method starts at block 702 where pump light is directed into an end of a nonlinear waveguide that includes a backward phase grating. At step 704 a produced light is received from an output of the nonlinear waveguide. As discussed above, the produced light, either the second-harmonic light or the down conversion light, may be directed to a desired location by a light signal directing device such as a circulator, beam splitter, an input grating, etc.

Example Embodiments

Example 1 includes a nonlinear wave mixing system with grating assisted phase matching. The system includes a pump laser and a nonlinear waveguide. The pump laser is used to generate pump light at a select wavelength. The nonlinear waveguide is configured to generate produced light from the pump light that is directed into the nonlinear waveguide. The nonlinear waveguide includes at least one backward grating that is configured to diffract the produced light in a backward direction relative to a direction that the pump light entered nonlinear material of the nonlinear waveguide. The backward grating having a grating momentum that generates counter-propagating phase matching in the produced light.

Example 2 includes the system of Example 1, further wherein the nonlinear waveguide included a port. The pump light enters the port and the produced light exits the port.

Example 3 includes the system of any of the Examples 1-2, wherein the produced light is down conversion light. The grating momentum determined by pump phonon momentum of the pump light plus the sum of momentum of down converted photons Example 4 includes the system of any of the Examples 1-2, wherein the produced light is second-harmonic light. The grating momentum determined by two times the pump momentum of the pump light plus the momentum of the second-harmonic light.

Example 5 includes the system of any of the Examples 1-4, wherein the at least one backward grating further includes at least one sidewall grating formed in the nonlinear waveguide.

Example 6 includes the system of Example 5, wherein the at least one sidewall grating further includes a first sidewall grating formed in the nonlinear waveguide and a second sidewall grating formed in the nonlinear waveguide.

Example 7 includes the system of any of the Examples 1-6, further including at least one light signal directing device configured to direct the pump light into an end of the nonlinear waveguide and direct the produced light to an output.

Example 8 include the system of Example 7, wherein the at least one light signal directing device is at least one of a circulator and a beam splitter.

Example 9 includes the system of any of the Examples 1-8, further including an input grating. The input grating configured to direct the pump light to the backward grating.

Example 10 includes the system of Example 9, wherein the input grating is further configured to output the produced light in a different direction from a direction the pump light enters the input grating.

Example 11 includes the system of any of the Examples 1-4 and 7-10, wherein the backward grating includes one of at least one sidewall grating, a hole configuration nonlinear waveguide, and spaced pillars.

Example 12 includes a nonlinear waveguide for a nonlinear wave mixing system, the nonlinear waveguide including nonlinear material and a backward grating. The nonlinear material is configured to generate produced light from pump light. The backward grating is formed in the nonlinear material. The backward grating is configured to diffract the produced light in a backward direction relative to a direction the produced light travels in the nonlinear material to reach the backward grating. The backward grating has a grating momentum that generates counter-propagating phase matching in the produced light.

Example 13 includes the nonlinear waveguide of Example 12, wherein the backward grating further includes at least one sidewall grating that is formed in the nonlinear waveguide.

Example 14 includes the nonlinear waveguide of Example 13, wherein the at least one sidewall grating further includes a first sidewall grating formed in the nonlinear waveguide and a second sidewall grating formed in the nonlinear waveguide.

Example 15 includes the nonlinear waveguide of any of the Examples 12-14, further including a port. The pump light entering the port and the produced light exiting the port.

Example 16 includes the nonlinear waveguide of any of the Examples 12-15, further including an input grating. The input grating configured to direct the pump light to the backward grating and output the produced light in a different direction from a direction that the pump light enters the input grating.

Example 17 includes a method of forming a nonlinear wave mixing system with grating assisted phase matching. The method includes determining a momentum of a backward grating needed to generate counter-propagating phase matching in produced light; and forming the backward grating using the determined momentum of the backward grating in a nonlinear waveguide. The backward grating configured to diffract the produced light in a backward direction relative to a direction the produced light traveled in the nonlinear waveguide to reach the backward grating.

Example 18 includes the method of Example 17, wherein the forming of the backward grating further includes writing the backward grating into a lithography mask; positioning the lithography mask on the nonlinear waveguide; and using photolithographic techniques using the lithography mask.

Example 19 includes the method of any of the Examples 17-18, wherein determining a momentum of a backward grating further includes using a finite difference time domain simulation tool to determine a momentum of pump light and the produced light, the nonlinear waveguide generating the produced light from the pump light.

Example 20 includes the method of Example 19, further wherein, when the produced light is a down conversion light, determining the grating momentum by pump phonon momentum of the pump light plus the sum of momentum of down converted photons; and when the produced light is a second-harmonic light, determining the grating momentum by two times the pump momentum of the pump light plus a second-harmonic momentum of the second-harmonic light.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A method of forming a nonlinear wave mixing system with grating assisted phase matching, the method comprising:
    determining a momentum of a backward grating needed to generate counter-propagating phase matching in produced light; and
    forming the backward grating using the determined momentum of the backward grating in a nonlinear waveguide, the backward grating configured to diffract the produced light in a backward direction relative to a direction the produced light traveled in the nonlinear waveguide to reach the backward grating, the backward grating including at least one short period sidewall that provides a grating diffraction momentum that produces a phase matching condition.

2. The method of claim 1, wherein the forming of the backward grating further comprises:
    writing the backward grating into a lithography mask;
    positioning the lithography mask on the nonlinear waveguide; and
    using photolithographic techniques using the lithography mask.

3. The method of claim 1, wherein determining the momentum of the backward grating further comprises:
    using a finite difference time domain simulation tool to determine a momentum of pump light and the produced light, the nonlinear waveguide generating the produced light from the pump light.

4. The method of claim 3, further wherein:
    when the produced light is a down conversion light, determining the grating momentum by a pump photon momentum of the pump light plus a sum of momentum of down converted photons; and
    when the produced light is a second-harmonic light, determining the grating momentum by two times the pump photon momentum of the pump light plus a second-harmonic momentum of the second-harmonic light.

* * * * *